2,874,035

PROCESS OF IMPROVING FOREST SOIL AND ARBOREAL GROWTH

Hermann Mayer-Krapoll, Hoesel, Bezirk Dusseldorf, Germany, assignor to Ruhr-Stickstoff Aktiengesellschaft, Bochum, Germany, a German company No Drawing. Application January 14, 1955
Serial No. 481,961

Claims priority, application Germany January 14, 1954

5 Claims. (Cl. 71—1)

The present invention relates to a process of improving soil quality and plant growth and more particularly to a process of improving and reconditioning forest soil, thereby, at the same time, increasing arboreal growth.

It is known that the top soil formed by the deposition of shed needles and/or leaves of forest trees fails to supply, to an ever increasing extent, the nutrients required for keeping trees and forests in healthy condition and for maintaining the biogenic nutritional cycle of the forest soil. This failure is especially apparent in case of forests solely consisting of coniferous trees. Attempts have been made to activate such more or less biologically dead top soil layers which are also designated as crude leaf-mold surface mulch or crude humus, for instance, by the addition of lime. However, such lime addition was unsuccessful and did not produce any long-lasting satisfactory result. In quite a number of instances such an activation treatment even resulted in injury to the forest trees.

It is one object of the present invention to provide a new and highly effective process of reactivating and improving forest soil and of reconditioning worn out forest soil, thereby considerably increasing the water-retaining power of the soil and achieving a rather surprising improvement of arboreal growth and health.

This result is achieved according to the present invention by supplying ammonia-nitrogen to the crude humus top soil either in the form of gaseous ammonia or of liquid ammonia, of aqueous ammonia or of aqueous solutions of ammonium salts, such as, for instance, ammonium sulfate, ammonium chloride, ammonium carbonate, ammonium phosphate, ammonium nitrate, and others. The amount of said ammonia-nitrogen to be supplied to the forest soil is only a fraction of the amount of nitrogen present in said crude humus. Amounts between about 10% and about 15% of the nitrogen content of crude humus have proved quite satisfactory. If, for instance, the nitrogen content of crude humus is 1.5% of the organic dry substance, fully satisfactory results are achieved by applying between 0.125% and 0.5% of nitrogen, calculated for the weight of the crude humus, in the form of ammonia to the forest soil in order to achieve a surprisingly effective and rapid improvement and reconditioning of the treated soil and conversion of the crude humus into stable, readily plant-assimilable humus. At the same time arboreal growth and wood quality are considerably improved since the resulting favorable effect lasts for about 10 years and longer under otherwise unchanged conditions of management and exploitation. It is very surprising that amounts of ammonia-nitrogen which are far below 1% of the organic dry substance and which are preferably, for instance, between about 0.125% and about 0.5% thereof, i. e. which amounts are only between about 8% and about 33% of the nitrogen present therein, are sufficient to exert their favorable effects for 15 to 20 years.

Nitrate-nitrogen cannot be substituted for said ammonia-nitrogen. Apparently only ammonia-nitrogen is capable of activating the blocked or tied up inactive nitrogen present in crude humus of forest soil as a result of a stimulation of the activity of microorganisms present in said humus. By said increase in activity of the microorganisms a surprising improvement of the soil is achieved and said improvement is only slowly and gradually repressed and obviated, in the course of many years, by the shed needles covering the soil. Said shed needles lack the required nitrogen which is present, to a certain extent, in mixed stands of foliaged trees and coniferous trees. Economic necessities, however, require increased planting of mono-cultures of coniferous trees.

The surprising effect of the application of ammonia-nitrogen to crude humus according to the present invention can be explained by a stimulation of the activity of microorganisms present in the top layer of the forest soil. Said effect can be ascertained by constant supervision and repeated determination of the content, in the crude humus dry substance, of nitrogen assimilable by plants. Said nitrogen content, on supplying ammonia-nitrogen to the soil, rapidly increases from an initial value of about 1.5% plus about 0.2% of added ammonia-nitrogen to a value of 4% and more and even up to a value of about 7%. Said increase becomes apparent in the course of a few months after the addition of ammonia-nitrogen to such crude humus.

In outdoor experiments it was found that, three months after application of ammonia-nitrogen in an amount corresponding to 0.01% of the weight of the organic dry substance to the crude humus of a coniferous forest, said humus layer having a depth of 50 cm., the assimilable nitrogen content of said treated humus layer was increased to about 4% of assimilable nitrogen from an initial total nitrogen content of 1.516%.

While the invention is not intended to be limited to any particular theory of explaining such an extraordinary and surprising increase in assimilable nitrogen, the theory may be advanced that said increase is caused, on the one hand, by splitting up nitrogen containing heterocyclic compounds present in the crude humus top soil layer and, on the other hand, by continuous synthesis and decomposition of bacterial proteins. Stimulation of the activity of microorganisms present in said crude humus and, due thereto, conversion of blocked, non-assimilable nitrogen into plant-assimilable nitrogen proceeds throughout the entire depth of the crude humus top soil layer. Thereby water soluble ammonium salts of humic acids are formed which, due to their water solubility, in contrast to the calcium salts of humic acids, are capable of passing in downward direction through said layer. As a result thereof the water repellent behavior of the crude humus top soil layer is changed and said change, apparently, is responsible for the fact that a considerable increase in water retaining power is imparted to forest soil treated according to the process of the present invention. Said increased water retaining power, in turn, causes improvement and, under certain conditions, re-conditioning of the forest soil and increase in arboreal growth.

Application of ammonia-nitrogen to crude humus evidently starts some kind of a chain reaction resulting in a spontaneous elimination of the shortcomings encountered heretofore. Said chain reaction would continue forever if the favorable conditions created thereby were not gradually and constantly destroyed by the present day's predominantly used methods of cultivation, namely by the method of planting mono-cultures of coniferous trees.

However, as explained hereinbefore, such a gradual change in conditions requires considerable time. Furthermore, the amounts of ammonia given are comparatively small and do not serve as plant-food, in contrast to the application of fertilizers to farmland, but serve as activating agents for the microorganisms present in the crude humus. Consequently the process according to the present invention is not only economically feasible but also, even when applied under unfavorable conditions, economically sound.

To illustrate the present invention it might be mentioned that the organic matter in a crude humus top soil layer amounts to about 20,000 kg. per hectare and per cm. thickness. Consequently such a crude humus layer of the usual thickness of 5 cm. contains about 100,000 kg. of organic matter per hectare. Ordinarily the organic matter in such a layer contains about 1.5% of nitrogen corresponding to about 1,500 kg. of total nitrogen per hectare. Most of said large amount of nitrogen, however, is not available to plants because the nitrogen is present therein in a non-assimilable form.

Adding to said crude humus top soil layer an amount of ammonia-nitrogen of about 200 kg. results, by computation, in an increase of the nitrogen content of said layer from 1.5% to only 1.7%. Actually, however—and this is very surprising—at least 4% of nitrogen are produced and converted into nitrogen assimilable by plants. It is evident that, with respect to the question of utilization of the nitrogen, an addition of only 200 kg. of nitrogen per hectare causes the production of 4,000 kg. of nitrogen per hectare in an assimilable form in a top layer of 5 cm. thickness. This production of nitrogen is achieved within a rather short period of time, for instance, within about 2 to 4 months. Furthermore, the increased activity of the microorganisms prevents, in the stable humus formed thereby, blocking and rendering non-assimilable the nitrogen of the decaying products of the shed needles. The great economical advantage achieved by the process according to the present invention becomes clearly apparent from these facts since the expenses incurred by adding 200 kg. of ammonia-nitrogen to one hectare of forest soil with a crude humus top soil layer of 5 cm. thickness are, without any question, bearable since they can be spread over a period of 10 years and actually over a much longer period of time. Investigation of the arboreal growth, furthermore, shows that the costs of addition of ammonia-nitrogen are many times compensated for by a considerable increase in growth. In these calculations the above mentioned improvement in water retaining power of the treated crude humus layer is not even taken into account. Said increased water retaining power has not only an exceedingly favorable effect upon the forest itself but also upon adjoining farm land and pasture and, furthermore, upon the quality of downhill flowing water and especially upon the regulation of the entire water supply of the respective region. For instance, those parts of the forest land which are worn out and in bad condition and which amount, in many European countries, to 65% of the entire area covered by forests, are reconditioned and reconverted by the process according to the present invention into a real water reservoir in times of a low water level.

A further advantage of the process according to the present invention consists in the feature that, due to the rapid activation caused by the application of ammonia-nitrogen which acts as kind of a primer, the crude humus top soil layer can be rendered suitable, for the germination of seeds which have fallen off. It may be pointed out that, in forestry, special importance is attached to natural regeneration. Young seedlings, however, perish to a very large extent in crude humus because the crude humus top soil layer does not posses the required properties to enhance germination and promote growth of the seedlings. Due to its water repellent properties such soil is usually too dry so that the germinated seedlings dry up. A crude humus top soil layer treated according to the present invention, however, represents an ideal soil for germinating and growing wild seedlings, especially since thereby assimilable nitrogen is made available to said seedlings. It is possible, due to the rapid action of the process according to this invention, to properly prepare in due time the crude humus top soil layer so as to create most suitable conditions for germination and growth.

It is, of course, possible to add other compounds, such as trace elements, to the soil together with or separately from the addition of ammonia-nitrogen, provided that such additions do not exert a harmful effect. Application of lime, when given alone to crude humus, has disadvantageous effects as pointed out hereinbefore. However, it is quite possible to apply lime simultaneously with ammonia-nitrogen. Preferably the amount of lime added is kept comparatively small. Addition of other compounds, however, is not at all necessary since very good results are achieved by the sole addition of ammonia-nitrogen.

It has previously been suggested to apply fertilizers to forest trees and forest soil in a similar manner as, for instance, arable farm land and field plants are manured and treated with ammonium salt fertilizers. Such a procedure, however, is not only uneconomical but it is also quite unsuccessful because applying such ammonium salt fertilizers to forest trees produces the danger of a harmful nitrogen shock. Furthermore, supplying nitrogen to the roots of forest trees does not improve the crude humus top soil layer, does not increase its water retaining power, and does not render more assimilable the nutrients contained therein.

In contrast to said known treatment of forest trees with nitrogen fertilizers, the process according to the present invention, i. e. the addition of comparatively small amounts of ammonia-nitrogen and especially of gaseous ammonia to the crude humus top soil layer, causes activation of the microorganisms present in said layer. Thereby the crude humus is converted into nutritive humus due to said activation and partly due to a chemical combination of the added ammonia-nitrogen. Thereby, the danger of a nitrogen shock is avoided, the water retaining power and the structure of the crude humus top soil layer is considerably improved, the crude humus is converted into stable nutritive humus, and the nutrients present in the top soil layer are rendered assimilable by plants. The amount of ammonia-nitrogen to be added is economically feasible and exerts its effect over a period of many years.

It is understood, of course, that the thickness of the crude humus top soil layer is not limited to the value of 5 cm. as given hereinbefore. Said layer often has a mean thickness of 8 to 10 cm. The maximum amount of ammonia-nitrogen to be added is about 1% of the content of organic dry matter in said crude humus top soil layer. Usually good results are achieved with much smaller amounts. Amounts between 200 kg. and 250 kg. of ammonia-nitrogen per hectare have proved to be fully satisfactory in treating a crude humus top soil layer of 10 cm. thickness.

Ammonia-nitrogen is applied, for instance, by spraying the crude humus top soil layer with an aqueous solution of the required amounts of a suitable ammonium salt whereby uniform distribution of the salt is preferably achieved by subsequent raking of the comparatively thin crude humus layer. Other methods of supplying ammonia-nitrogen to said crude humus layer may, of course, also be employed.

The application of the gaseous ammonia into the forest soil to realize the effect in the meaning of the present patent application is carried through in such a way that by means of a rotating roller about 130,000 holes per hectare worked on are pierced, whereby 1.5 grams of N (in the form of gaseous ammonia) are applied into the soil by each perforation. The extent of penetration of the $NH_3$ gas at first amounts to about 7 cm. as calculated from the piercing point, genuine humus matter being formed with the penetration of the gas. The piercing points are at a distance of 32 cm. from each other. In the course of a few weeks this process will also take place between the individual piercing points in those sections which had so far remained free from gas in the treatment of the soil. These processes are initiated in consequence of the treatment with gaseous ammonia by complex biological, chemical and physical reactions.

I claim:

1. In a process of reactivating the substantially biologically dead leaf-mold surface mulch of forest soil and improving the water retaining power of such soil, the step comprising introducing into the uppermost crude humus top soil layer of such leaf-mold surface mulch a compound yielding ammonia-nitrogen, said compound being selected from the group consisting of gaseous ammonia and aqueous ammonium salt solutions in an amount between about 0.125% and about 1.0% of the dry weight of organic matter present in said leaf-mold surface mulch.

2. In a process of reactivating the substantially biologically dead leaf-mold surface mulch of forest soil and improving the water retaining power of such soil, the steps comprising introducing into the uppermost crude humus top soil layer of such leaf-mold surface mulch a compound yielding ammonia-nitrogen, said compound being selected from the group consisting of gaseous ammonia and aqueous ammonium salt solutions in an amount between about 0.125% and about 1.0% of the dry weight of organic matter present in said leaf-mold surface mulch and repeating such a treatment in intervals of several years.

3. In a process of reactivating the substantially biologically dead leaf-mold surface mulch of forest soil and improving the water retaining power of such soil, the step comprising introducing into the uppermost crude humus top soil layer of such leaf-mold surface mulch gaseous ammonia in an amount between about 0.125% and about 1.0% of the dry weight of organic matter present in said leaf-mold surface mulch.

4. In a process of reactivating the substantially biologically dead leaf-mold surface mulch of forest soil and improving the water retaining power of such soil, the step comprising introducing into the uppermost crude humus top soil layer of such leaf-mold surface mulch an aqueous ammonium salt solution in an amount between about 0.125% and about 1.0% of the dry weight of organic matter present in said leaf-mold surface mulch.

5. In a process of reactivating the substantially biologically dead leaf-mold surface mulch of forest soil and improving the water retaining power of such soil, the step comprising introducing into the uppermost crude humus top soil layer of such leaf-mold surface mulch a compound yielding ammonia-nitrogen, said compound being selected from the group consisting of gaseous ammonia and aqueous ammonium salt solutions in an amount between about 0.125 and about 0.5% of the dry weight of organic matter present in said leaf-mold surface mulch.

References Cited in the file of this patent

UNITED STATES PATENTS

| | | |
|---|---|---|
| 1,173,534 | Ryan | Feb. 29, 1916 |
| 2,020,824 | De Bruyn | Nov. 12, 1935 |
| 2,038,316 | Rosenstein | Apr. 21, 1936 |
| 2,285,932 | Leavitt | June 9, 1942 |